April 27, 1954     W. E. BURDICK     2,676,550
RAILWAY VEHICLE ANTINOSING DEVICE
Filed Sept. 14, 1950     4 Sheets-Sheet 1

Inventor
William E. Burdick
By Rodney Bedell
Atty.

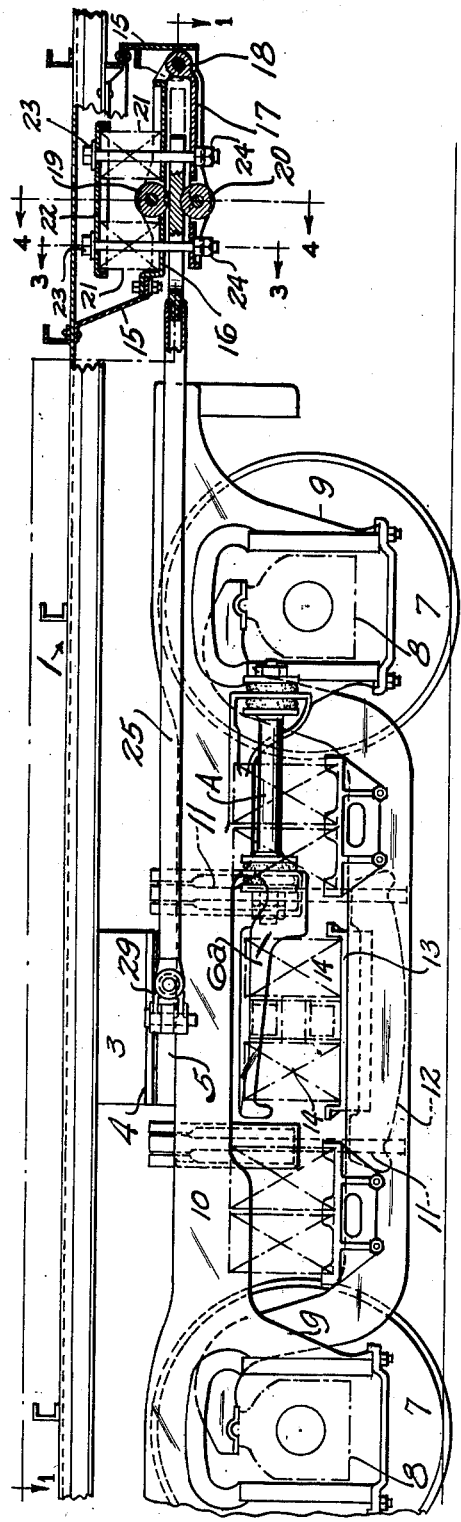

April 27, 1954 W. E. BURDICK 2,676,550
RAILWAY VEHICLE ANTINOSING DEVICE
Filed Sept. 14, 1950 4 Sheets-Sheet 3

Inventor
William E. Burdick
by Rodney Bedell
Atty.

April 27, 1954  W. E. BURDICK  2,676,550
RAILWAY VEHICLE ANTINOSING DEVICE
Filed Sept. 14, 1950  4 Sheets-Sheet 4

Inventor
William E. Burdick
By Rodney Bedell
Atty.

Patented Apr. 27, 1954

2,676,550

UNITED STATES PATENT OFFICE 2,676,550

RAILWAY VEHICLE ANTINOSING DEVICE

William E. Burdick, St. Louis, Mo., assignor to General Steel Castings Corporation, Granite City, Ill., a corporation of Delaware Application September 14, 1950, Serial No. 184,890

8 Claims. (Cl. 105—199)

The invention relates to railway rolling stock and more particularly to the assembly of a vehicle body and a swivel truck and the invention consists in a device for resisting the tendency of the truck and body to swivel relative to each other on straight track and thereby prevent "nosing."

The term "nosing," as applied to a railway vehicle, refers to the oscillation of the ends of the truck transversely of the track due to the engagement of the flanges of the wheels of the truck alternately with the rails at opposite sides of the track. Such oscillation produces transverse shocks carried to the vehicle body which is undesirable, particularly in passenger train operation. These shocks are augmented when the truck bolster is mounted upon hangers or rockers which provide for movement of the bolster transversely of the truck. The object of the present invention is to hold the truck against such oscillation and the resulting undesirable transverse thrusts on the vehicle body.

There have been applications of an anti-nosing device to an end of the truck and the adjacent portion of the body which operates satisfactorily provided the truck does not have a lateral motion bolster. If the truck bolster has lateral motion, the truck may swing about the end to which the anti-nosing device is applied since the bolster center plate is not fixed laterally relative to the truck frame and axles. Hence, it has been proposed to employ spaced anti-nosing devices to avoid the truck pivoting about a single device because of the lateral motion of the bolster. While it is likely two separate devices for resisting anti-nosing may be applied to the vehicle truck and body, and widely spaced from each other for most effective operation, it is a further object of the present invention to resist nosing by a single device even where the truck includes a lateral motion bolster.

In the accompanying drawings illustrating a selected embodiment of the invention:

Figure 1 is a top view of one end of a vehicle body and an associated four-wheel truck, certain parts only of the body framing being shown to more clearly illustrate the truck structure beneath the body which is shown in solid lines in its normal position aligned with the vehicle body and the truck frame is indicated in dot and dash lines in positions in which it is rotated from its normal aligned relation to the vehicle body.

Figure 2 is a side elevation of the structure shown in Figure 1 but is sectioned in part on the line 2—2 of Figure 1 and is drawn to enlarged scale.

Figures 3 and 4 are vertical transverse sections taken on the corresponding section lines of Figure 2.

Figure 5 is a detailed perspective of a roller track member applied to the truck frame.

Figure 1:
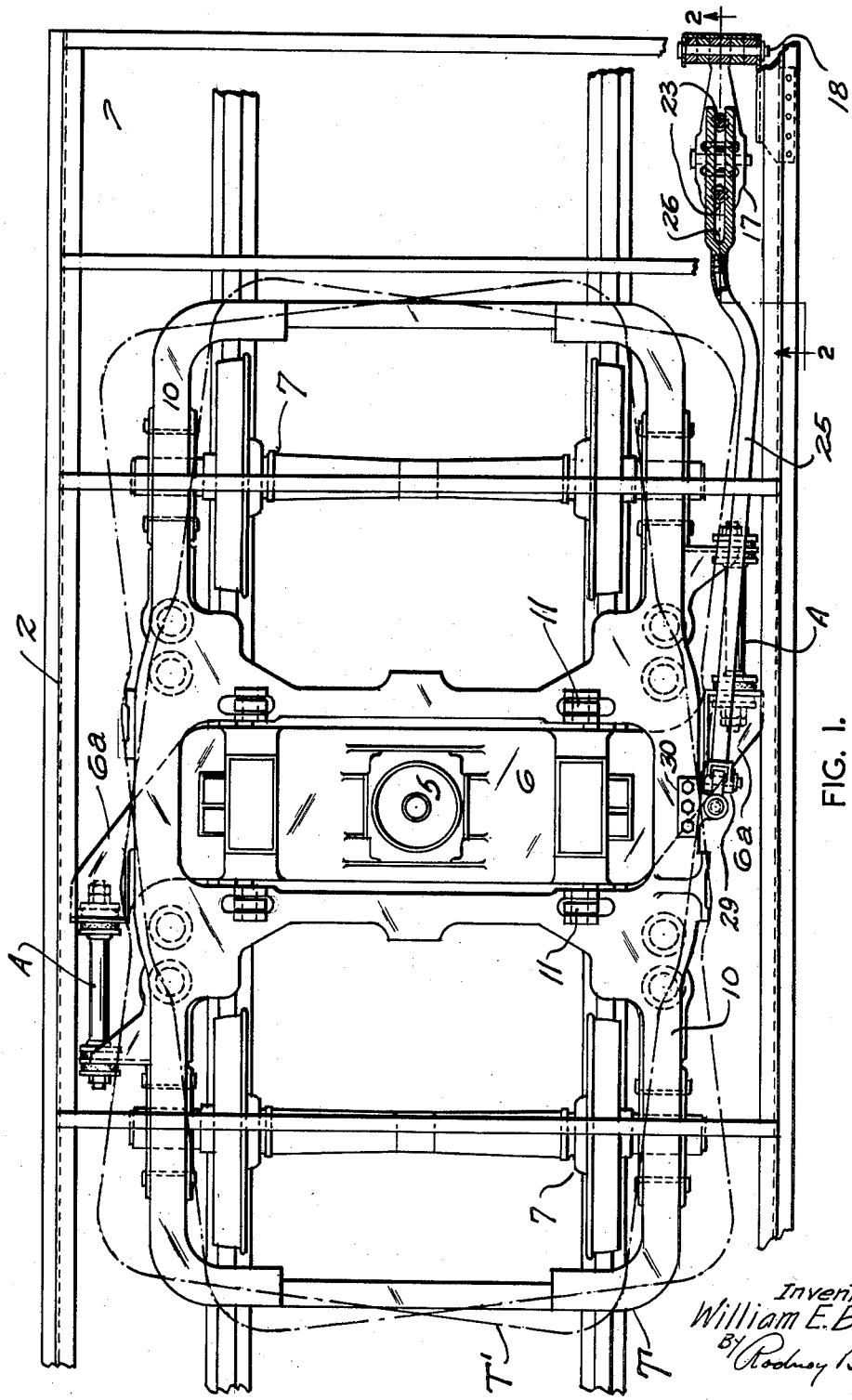

In the form of the invention shown in Figures 1-5 the vehicle body is indicated by the underframe 1 and includes longitudinal sills 2 and a transverse bolster 3 having a center plate 4 mounted upon a corresponding center plate 5 forming a portion of the truck bolster 6.

The truck shown has two wheel and axle assemblies 7 mounting journal boxes 8 slidably received in pedestals 9 of the truck frame which includes side members 10. A pair of hangers 11 are pivotally suspended from each side of the truck frame to swing transversely of the vehicle, and a cross bar 12 extending between the lower ends of each pair of hangers carries one end of a spring plank 13 on which the bolster springs 14 are seated. This well-known arrangement provides for the movement of truck bolster 6, and the vehicle body, transversely of the truck frame and wheeled axles to dissipate lateral shocks. The ends of bolster 6 have extensions 6a connected to truck frame 10 by anchors A which hold the bolster and truck frame against substantial movement relative to each other longitudinally of the vehicle but accommodate their relative lateral movement as is common practice in railway truck structure.

Center plates 4 and 5 accommodate the swiveling of the truck relative to the vehicle body from the solid line position of the truck indicated at T in Figure 1 to the broken line position of the truck indicated at T'. Such relative swiveling of the truck and underframe is yieldingly resisted by an anti-nosing device comprising cooperating members secured to the truck and underframe respectively.

Bracket structure 15 is secured to and depends from the vehicle body underframe 1 and mounts a roller carrier 16. A cooperating roller carrier 17 is pivoted at 18 to carrier 16. Rollers 19 and 20 are journaled on carriers 16 and 17 respectively, one above the other. Helical springs 21 are seated on carrier 16 and mount a spring cap 22. Bolts 23 extend from cap 22 downwardly through springs 21 and carriers 16, 17. When bolt nuts 24 are tightened, springs 21 are compressed and thrust carriers 16, 17 and rollers 19, 20 towards each other.

An elongated link 25 extends longitudinally of the vehicle and at its right-hand end is bifurcated or slotted at 26 to straddle bolts 23. The upper and lower faces of the link bifurcations from tracks 27 and 28 respectively, engaged by the peripheries of rollers 19 and 20. The left-hand end of link 25 is connected by a universal joint clevis 29 to a bracket 30 secured to truck frame side member 10.

When the vehicle is on tangent (straight) track and the longitudinal center lines of the vehicle body and truck are aligned (what may be termed a normal position), rollers 20 are seated in depressions 31 in tracks 28. If the truck swivels relative to the body, as indicated by the dot and dash lines T' in Figure 1, roller 20 must ride up the inclined portions of the tracks against the resistance of springs 21, the tension of which may be controlled by nuts 24. This resistance tends to hold the truck against nosing, but does not interfere with required swiveling of the truck when the vehicle enters curved track. Link 25 is offset laterally of the truck to accommodate swiveling of the truck frame.

The universal joint connection between link 25 and the truck frame freely accommodates lateral swinging of the vehicle body with truck bolster 6, on its hangers 11, relative to the truck frame and also accommodates vertical movement of the vehicle body, relative to the truck frame, due to action of bolster springs 14, without causing relative movement of link 25 and tracks 27, 28 longitudinally of the vehicle and resulting displacement of rollers 20 vertically.

Figures 6, 7:
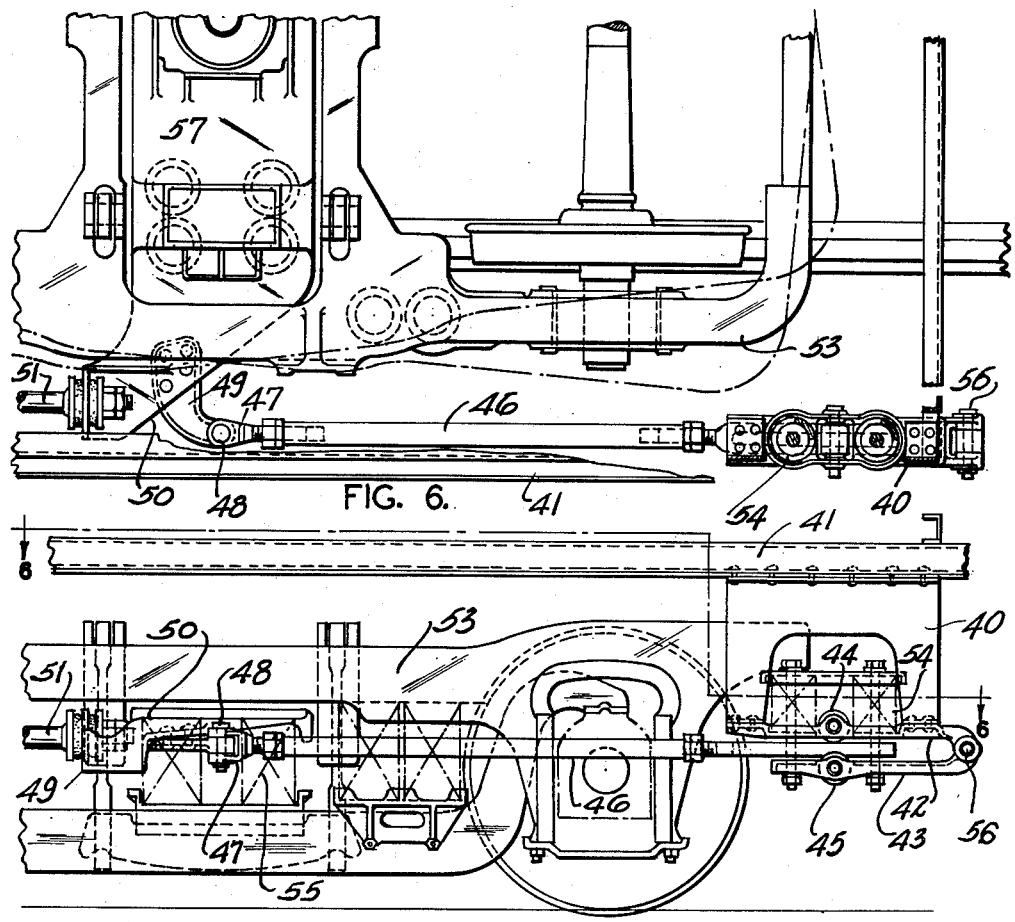
Figure 6 is a top view, sectioned in part on the line 6—6 of Figure 7, and shows one corner of a track illustrating another form of the invention.
Figure 7 is a side view of the structure shown in Figure 6.

Figures 6 and 7 illustrate another form of the invention in which the vehicle truck and body structure is substantially the same as that described above but the elongated link and its connections to the truck and body respectively differ from the connections previously described. Bracket 40 depends from the vehicle underframe nearer to the side sill 41 and is substantially deeper than the brackets shown in Figure 2 and mounts carriers 42 and 43 and the rollers 44 and 45 thereon at a lower level than the corresponding parts of the earlier described arrangement. Link 46 is substantially straight from end to end and its left-hand end is connected by a clevis 47, having a single pair of jaws and a single pivot pin 48, to a bracket 49 mounted on the truck bolster extension 50 to which the bolster frame anchor 51 is attached.

With this arrangement the anti-nosing thrust is transmitted through the truck bolster 57 and its anchor 51 rather than directly to the truck frame 53 but the anti-nosing device springs 54 have a greater leverage to resist swiveling because they and the link are spaced laterally from the center line of the vehicle a greater distance than indicated in Figure 1. Also with this arrangement the link is positioned far enough from the longitudinal center line of the vehicle that the link does not need to be offset to clear the truck frame as it swivels on the vehicle body. Since the link is secured to the truck bolster, on which the vehicle body rests, the link remains paralleled to the vehicle body as the truck bolster rises and falls according to the action of the bolster springs 55 and there is no need for an additional horizontal pivot as in the previous arrangement where the left-hand end of the link is connected to the truck frame. Pivot pin 56 which connects carriers 42 and 43 takes the link thrust and carrier 42 transmits the thrust through bracket 40 to the body. The general arrangement and operation is otherwise the same as previously described and the nosing of the truck is resisted by the combination of rollers normally seated in track depressions from which they move only by overcoming the resistance of rollers 45 and springs 54.

If the device is to be used only to prevent nosing of the truck when on tangent track, the notch in the bar would require a contour which would provide for a desired amount of resistance against swiveling action of the truck relative to the car body through a very small angle of movement only, as such angle would be limited by the amount of swiveling action that would be required to take up the clearance between rail and wheel flange and the remaining surface of the bar on which the roller travels should be straight. There will then be no resistance to swivel action of the truck when rounding curves except such comparatively slight resistance due to rolling friction between the roller and the straight surface on the bar which would be negligible.

Figure 8:
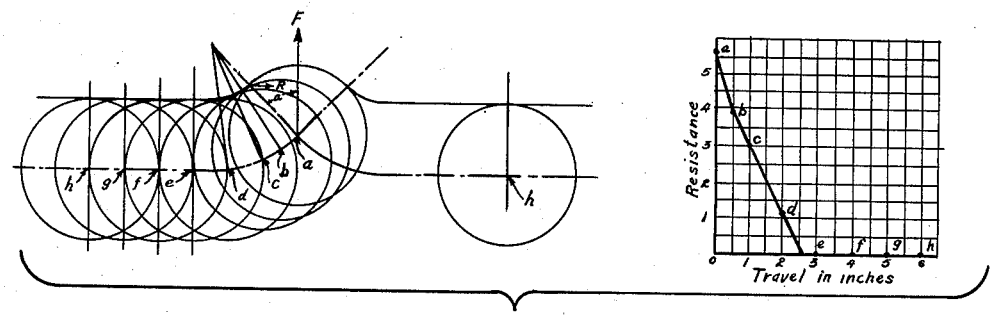
Figures 8, 9 and 10 are diagrams and associated graphs indicating construction and effect of different contours of the roller track.
Figure 9:
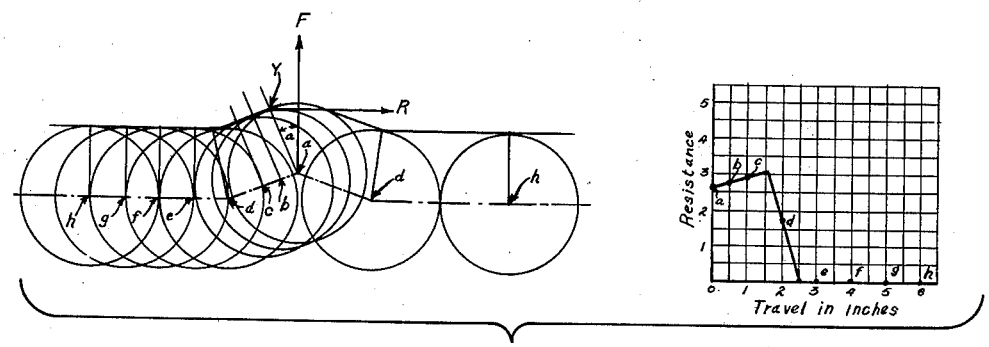
Figure 10:
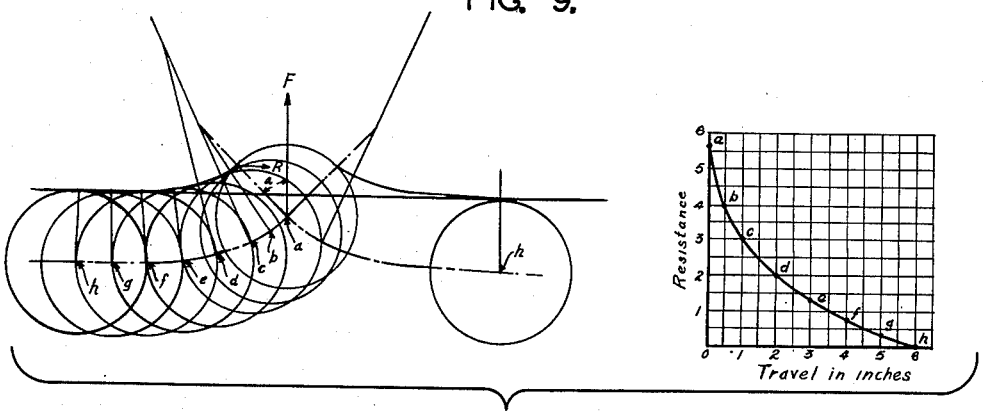

In some applications of the device it may be desirable to maintain some type of resistance against random swivel while the car is negotiating curves at or near the optimum speed for a super-elevated track. For instance, at the optimum speed on curves with super-elevated track it has been found in certain instances that where no restraint device is used, nosing and shimmying has occurred. In other words, under such conditions of curve operations there is little or no lateral pressure between the wheel and the rail, and therefore the truck may execute random angular oscillations about the truck center plate corresponding to nosing on tangent track. To prevent this and to insure that the leading wheel is bearing against the rail, the contour of the bar may be designed so that as the roller travels along the bar there may be provided almost any desired resistance within the limitations of design considering bearing pressures, etc. For instance, it may be desirable to design the cam surface or notch in the bar so that the resistance against swivel action will be greatest when the car is on tangent track and decreased to zero as the truck swivels the amount required for a ten degree curve; or it may be desirable to provide a resistance which would decrease to zero as the truck swivels the amount required for a maximum curve of twenty-two degrees. Figures 8, 9, and 10 illustrate these different conditions.

Figure 8 shows a diagrammatic arrangement of roller and notched bar with the roller indicated in its central position $a$ in the notch and at other positions $b$, $c$, $d$, $e$, $f$, $g$, and $h$, as moved in one direction from the central position $a$. If the travel from $a$ to $h$ is divided into six units of length, each unit consisting of one inch, the resistance offered by the arrangement may be plotted versus the travel as indicated in the corresponding graph at the right. The resistance is simply indicated in units 1, 2, 3, etc. along the ordinates of the graph. The travel in inches is indicated along the graph abscissas. When the axis of the roller (at its center) moves from its central position $a$ to the position midway between $d$ and $e$, approximately 2½ inches, or the position of travel after a car, having trucks spaced a certain distance apart, has entered a curve of about ten degrees, the resistance will be decreased substantially uniformly from the central position $a$ to zero resistance. In other words when the car is on a ten degree, or greater, curve, the device will offer no resistance to swivel action.

Figure 9 shows another diagrammatic arrangement similar to that shown in Figure 8, but there is a straight inclined surface on the bar along which the roller travels from position $a$ to a point midway between position $c$ and $d$. The remaining surface of the bar being horizontal from this point to position $h$. The resistance for this type of notched bar will be in the associated graph. When the roller travels from its central position $a$ to the position $d$ which is approximately 2 inches, the resistance will increase to the maximum midway between $c$ and $d$ and then decrease to zero midway between $d$ and $e$. This increase of resistance from position $a$ to a position midway between $c$ and $d$ occurs because the angle $a$ does not change until the position midway between $c$ and $d$ is reached. The increased resistance from position $a$ to the maximum resistance position midway between $c$ and $d$ is due to increased spring pressure because the spring which acts on the roller is compressed a greater amount as the roller travels from position $a$ to the maximum resistance position midway between $c$ and $d$. During this travel the angle of resistance $a$ remains the same. The position midway between $d$ and $e$ is the ten degree curve positions. From the ten degree curve position to the "$h$" position, that is, the approximate twenty-two degree curve position, the roller will travel through zero resistance.

Figure 10 shows another diagrammatic arrangement of roller and notched bar in which the resistance to swivel action of the truck decreases to zero from position $a$ to the total travel position $h$, the "$h$" position representing the position of the roller when the car is on a maximum curve of about twenty-two degrees, and when on a lesser degree curved track there will be a certain amount of resistance. For instance, when on a ten degree curve, where the roller is in a position substantially midway between $d$ and $e$, the resistance may be about ⅓ the amount of the resistance of the device when the roller is in its central position $a$. Thus there would be a substantial amount of resistance while the car is negotiating a ten degree curve at or near the optimum speed for a super-elevated track.

The anti-nosing device is shown as connected to one side of the truck and to the corresponding side of the vehicle frame but if desired the device and its connections may be duplicated at the opposite side of the vehicle. From the standpoint of operation of the device, it is immaterial whether the mounted bracket structure on the vehicle frame is between the center plate and the end of the vehicle or between the center plate and the middle of the vehicle, if the device is duplicated at opposite sides of the vehicle it is immaterial whether the links extend in the same direction or in opposite directions at the opposite sides of the truck. Likely the disposition of the links and the connections to the vehicle body will be determined by the necessity for clearing brake gear or other items of equipment on the truck and body.

The invention may be embodied in forms including other variations in the details of the structure without departing from the spirit of the invention and the exclusive use of those modifications coming within the scope of the claims is contemplated.

What is claimed is:

1. In a railway vehicle, body structure, truck structure swiveled thereto, said truck structure including a truck frame and wheel and axle assemblies positioned therein, said assemblies being held against movement transversely relative to the truck frame, a truck bolster movable laterally relative to the truck frame and including a center plate, and a device comprising an elongated linkage connected at one end to said truck structure at the side of the truck structure abreast of said center plate intermediate the ends of the truck structure and extending therefrom substantially longitudinally of the vehicle and connected at its other end to said body structure at a point spaced as far from said center plate as the end of the truck, said device including a track member secured to one of said structures, and a roller mounted on the other of said structures, there being a recess in said track member normally receiving said roller when the structures are in alignment longitudinally of the vehicle, there being means yieldingly thrusting said roller against said track member and offering restraint to movement of said roller out of said recess longitudinally of said track when said structures swing out of alignment.

2. In a railway vehicle, a body, a truck with a laterally moving bolster, a swiveling connection between the body and truck bolster, an elongated track member extending longitudinally of the vehicle and substantially horizontally with a portion recessed, a carrier member having rollers journaled thereon and position at opposite sides of said track and normally seated in said recessed portion, and means yieldingly thrusting the peripheries of said rollers against said track, one of said members being secured to and movable with the vehicle body and the other of said members being secured to and movable with the vehicle truck, and said track and rollers being positioned at a substantial distance horizontally from said swiveling connection.

3. In a railway vehicle, a body frame including side members, a truck swiveled to said underframe near the longitudinal center line thereof and having a frame including side members adjacent to said body side members and having a laterally moving bolster, a track connected to and movable with a side member on one of said frames and extending lengthwise of the vehicle with a recessed portion, a carrier connected to and movable with a corresponding side member of the other of said frames and provided with rollers journaled thereon at opposite sides of said track, and springs on said carrier thrusting the peripheries of said rollers against said track, said rollers being seated in the recessed portion of said track, when the longitudinal center lines of the truck and body frames are aligned, and said rollers being forced out of the recessed portion of said track when the truck swivels on the body from its aligned position.

4. In a railway vehicle, a truck including a frame and a bolster mounted on said frame for movement laterally thereof and provided with a center plate, a vehicle body carried by said truck and having a cooperating center plate, a member on said truck frame extending lengthwise of the truck frame and spaced from said center plates transversely of the vehicle and bifurcated lengthwise of the truck frame, tracks formed on the bifurcated parts and having recessed portions, rollers seated on said tracks and normally positioned in said recessed portions, carriers for said rollers movable towards and away from each other and mounted on the vehicle body, bolts extending through said carriers and between said bifurcated parts at opposite sides of said rollers, and springs on said bolts thrusting said carriers towards each other and thrusting said rollers against said tracks.

5. In a railway vehicle, a truck including a frame and a bolster mounted on said frame for movement laterally thereof and provided with a center plate intermediate the ends of said frame, a vehicle body with a center plate mounted on said truck center plate, an elongated linkage pivotally connected at one end to said truck at a point spaced transversely of the vehicle from and substantially abreast of said center plates, said linkage including a track extending lengthwise of the truck and provided with a recessed portion spaced substantially abreast of an end of the truck, a roller structure mounted on said body and riding on said track and normally positioned in said recessed portion, there being means thrusting said roller structure against said track and yieldingly resisting the riding of said roller out of the recessed portion of said track.

6. In a railway vehicle, a body structure, a truck structure swiveled thereto, and an antinosing device comprising a track having a pivotal connection to one of said structures and having a recessed portion spaced from said pivotal connection, a carrier fixed to the other of said structures and journaling a roller engaging one side of said track, and a carrier pivotally associated with said first-mentioned carrier and journaling a roller engaging the other side of said track, means yieldingly thrusting said rollers against said track, at least one of said rollers being seated in said recessed portion when the body structure and truck structure are aligned.

7. In a railway vehicle, body structure, truck structure swiveled thereto, said truck structure including a truck frame and wheel and axle assemblies positioned therein, said assemblies being held against movement transversely relative to the truck frame, a truck bolster movable laterally relative to the truck frame, and a device connected near one end to said truck structure at the side of the truck structure intermediate the ends of the truck structure and extending therefrom substantially longitudinally of the vehicle and connected near its other end to said body structure, said device including a track member having a part pivotally connected to the side of the truck frame, and a roller journaled on the body structure and engaging said track at a point remote from the pivotal connection of the latter to the truck frame, there being a recess in said track member normally receiving said roller when the structures are in alignment longitudinally of the vehicle, there being means yieldingly thrusting said roller against said track member and offering restraint to movement of said roller out of said recess longitudinally of said track when said structures swing out of alignment.

8. In a railway vehicle, body structure, truck structure swiveled thereto, said truck structure including a truck frame and wheel and axle assemblies positioned therein, said assemblies being held against movement transversely relative to the truck frame, a truck bolster movable laterally relative to the truck frame, and a device connected near one end to said truck structure at the side of the truck structure intermediate the ends of the truck structure and extending therefrom substantially longitudinally of the vehicle and connected near its other end to said body structure, said device including a track member having a part pivotally connected to an end portion of the truck bolster, and a roller journaled on the body structure and engaging said track at a point remote from the pivotal connection of the latter to the truck bolster, there being a recess in said track member normally receiving said roller when the structures are in alignment longitudinally of the vehicle, there being means yieldingly thrusting said roller against said track member and offering restraint to movement of said roller out of said recess longitudinally of said track when said structures swing out of alignment.

References Cited in the file of this patent

UNITED STATES PATENTS

| Number | Name | Date |
|---|---|---|
| 1,166,187 | Cooper | Dec. 28, 1915 |
| 1,408,371 | Linton | Feb. 28, 1922 |
| 2,025,931 | Blunt | Dec. 31, 1935 |
| 2,111,428 | Kjolseth | Mar. 15, 1938 |
| 2,111,429 | Kjolseth | Mar. 15, 1938 |
| 2,153,389 | Perkins | Apr. 4, 1939 |
| 2,227,140 | Kjolseth | Dec. 31, 1940 |
| 2,500,906 | Soloview | Mar. 14, 1950 |